United States Patent
Onsager

[15] 3,671,567
[45] June 20, 1972

[54] PRODUCTION OF ADIPONITRILE

[72] Inventor: Olav Torgeir Onsager, Waldwick, N.J.

[73] Assignee: Halcon International, Inc.

[22] Filed: April 29, 1970

[21] Appl. No.: 33,042

[52] U.S. Cl. .....................260/465.8 D, 260/465.1, 260/485, 260/537, 260/561, 260/593, 260/601
[51] Int. Cl. .......................................................C07c 121/26
[58] Field of Search................260/465.8 D, 465.8 R, 485 R, 260/537 R, 593 R, 601 R, 561 R

[56] References Cited

UNITED STATES PATENTS 2,956,075  10/1960  Boffa et al. ..........................260/465.8
3,444,235   5/1969  Chabardes et al. ..................260/465.8

*Primary Examiner*—Joseph P. Brust
*Attorney*—William C. Long, David Dick and Michael I. Wolfson

[57] ABSTRACT

The invention relates to the reductive coupling of organic halo compounds, especially organic halo nitriles, using a coupling composition comprising a metal and a salt of the same metal. The invention is especially concerned with recovery and reuse of the coupling composition.

8 Claims, No Drawings

PRODUCTION OF ADIPONITRILE

This invention relates to the reductive coupling of organic nitriles and, more particularly, to the recovery and reuse of the coupling composition.

It has recently been discovered that a halo organic compound having the formula:

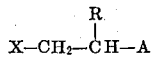

(wherein the A is a

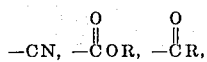

or

R is hydrogen or a lower alkyl having 1 to 4 carbon atoms; and X is chloro, bromo or iodo) may be reductively coupled to form

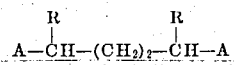

For example, 3-bromoproprionitrile may be coupled to form adiponitrile. The reaction is carried out in the liquid phase in the presence of a coupling composition which comprises a coupling agent and a promoting salt. This invention is described in detail in copending U.S. application Ser. No. 872,395, filed Oct. 29, 1969, the disclosure of which is incorporated herein by reference.

In order to make the reductive coupling process a commercially viable process, it is essential that the coupling agent, which has been converted to a metal halide during the reaction, be recovered. The recovery consists of two basic steps, separation of the oxidized coupling agent, and reduction thereof back to the original zero valent metal.

In accordance with this invention it has been found that recovery of the coupling agent can be greatly simplified to the marked advantage of the overall process by employing a promoting salt having a cation which is the same as the metal used in the coupling agent and by carefully limiting the reduction of the oxidized coupling metal. By following the aforesaid procedure, the size of the equipment required for reduction is markedly reduced and the energy required for regenerating the coupling agent is decreased. Additionally, the necessity of by-passing a part of the oxidized metal or incorporating separate solids handling equipment is eliminated.

It is also desirable that the anion of the promoting salt be the same halogen as the halogen forming part of the organic halide feedstock. The degree of partial reduction of the recovered metal halide is dependent on the ratio of promoting salt to coupling agent desired for use in the reductive coupling reaction. As disclosed in the aforesaid copending U.S. Pat. application, this ratio may vary broadly, however, it is preferred that the mole ratio be from 0.1 to 1.0. Accordingly, the conversion of the metal halide is preferably from 50 to 90 mole percent.

The reduction of the metal halide may be performed by any of the known techniques.

Reduction temperatures and the amount of hydrogen feed to the reduction zone are dependent on the metal salt and examples of these are set forth in the following table:

TABLE A

| Salt | Reduction Temp (°C) | $H_2$ (mols/mol salt) |
|---|---|---|
| $NiCl_2$ | 250–700 | 50–1.2 |
| $CoCl_2$ | 325–800 | 50–1.2 |
| $NiBr_2$ | 375–700 | 50–1.2 |
| $CoBr_2$ | 400–900 | 50–1.2 |
| $CrCl_3$ | 175–1000 | 75–0.6 |
| $FeCl_2$ | 525–1000 | 50–1.2 |
| $FeBr_2$ | 650–1000 | 50–1.2 |
| $CrBr_3$ | 200–1000 | 75–0.6 |

The rate at which hydrogen is fed to the reductive zone is preferably such as to provide as near to the equilibrium concentration of hydrogen bromide in the exit gas as is practical although this rate can be varied very widely.

These temperature ranges result in the formation of equilibrium amounts of hydrochloric or hydrobromic acid which are sufficient to permit economical recovery. Generally, the higher hydrogen amounts are used with the lower temperatures and vice versa.

In the case of the ferrous salts, the reduction temperature is above the melting point and, therefore, the preferred method of reduction is the spraying of a stream of the molten salt into the top of a column through a rising stream of reducing gas, e.g., hydrogen. The nickel, cobalt and chromium salts can be reduced in a rotary kiln or a fluidized bed, the salt being introduced as a particulate solid. Using aforesaid techniques, the conversion desired can be readily obtained by appropriately adjusting the residence time, temperature and hydrogen concentration.

Examples of the halo organic compound are 3-bromopropionitrile, 3-chloropropionitrile, 3-iodopropionitrile, 3-bromo-2-methyl propionitrile, 3-chloro-2-methyl propionitrile, 3-iodo-2-methyl propionitrile, 3-bromopropionic acid, 3-chloropropionic acid, 3-iodopropionic acid, 3-bromomethylpropionate, 3-chloromethyl propionate, 3-iodo methyl propionate, 3-bromopropionamide, 3-iodopropionamide, methyl(2-bromoethyl) ketone, methyl (2-iodethyl) ketone, methyl (2-chloroethyl) ketone.

Coupling compositions, as noted above, are comprised of two essential components, i.e., a coupling agent and a promoting salt. The former may be a metal having the atomic number 24 to 30, 47 to 52 or 80 to 83, inclusive, or a zero valent compound of the metal, such as, the carbonyl. These metals include Cr, Mn, Fe, Co, Ni, Cu, Zn, Ag, Cd, In, Sn, Sb, Te, Hg, Tl, Pb, and Bi. Additionally, compounds of Cr, V and Ti where the Cr, V and Ti are in the lower valence state, i.e., $Cr^{+2}$, $V^{+2}$ and $Ti^{+2}$, can be used. It is preferred, but not essential, that the coupling agent be added in finely divided form, for example, as metal powder, although the metals in bulk form, e.g., as sheets or large particles has also been found effective in the process of the invention.

The promoting salts are preferably anhydrous and have substantial solubility in the reaction system, e.g., at least 0.1 percent by weight and preferably at least 1 percent. The cation is the same as the metal used in the coupling agent. The anion of the salt is preferably a halogen such as bromine, iodine, or chlorine, but, in fact, may be substantially any anion which provides adequate solubility to the promoting salt.

By "reductive coupling" is meant a coupling of two molecules of the halo organic compound by the displacement of the halogens and the attachment of the carbons which contained these halogens to one another. Where a single halo organic compound is employed, the coupled product will represent a reduced dimer of the precursor of the halo organic compound. Where a mixture of different halo organic compounds is employed the coupled product will represent a mixture of reduced dimers of the precursors of each of the halo compounds as well as codimers.

The reductive coupling is carried out in liquid phase with the total system pressure being sufficient to maintain the liquid phase, e.g., 0.1 to about 4,000 atmospheres, preferably 1 to about 100 atmospheres. Preferably oxygen is excluded and an inert atmosphere is employed, e.g., nitrogen, argon, carbon dioxide or helium. With carbonyl compound catalysts, however, a carbon monoxide atmosphere is preferred.

The reaction temperature can range from 50° to 250° C. desirably from 80° to 200° C. and preferably from 100° to 175° C. The reaction time is sufficient to achieve the desired conversion and suitable reaction times range from 1 minute to about 50 hours, desirably 30 minutes to 40 hours, and preferably 2 to 20 hours.

In an especially preferred practice of the invention, the precursor which, upon addition of hydrogen halide, forms the functionally substituted halo organic compound is incorporated in the reaction system.

For example, in the case of 3-halopropionitrile, it is advantageous to incorporate acrylonitrile in the reaction system to reduce propionitrile make.

Solvents can be employed with materials which are formed during the reaction being preferred. For example, adiponitrile or propionitrile are preferred solvents in the coupling of 3-halopropionitrile. Other solvents can, however, be employed as illustrated by benzene, acetonitrile, acetic acid, ethyl acetate, chlorobenzene, benzonitrile, heptane, dimethyl formamide, dioxane, cyclohexane, tetrahydrofuran, triethylene glycol, and the like. Preferably the reaction mixture is maintained substantially anhydrous.

Suitable mixtures for accomplishing the reductive coupling may have the following illustrative composition by weight on a coupling composition free basis:

|  | Broad | Desired | Preferred |
|---|---|---|---|
| Halo organic compound | 10–100% | 20–99% | 50–98% |
| Halo organic compound precursor | 0–90% | 1.0–80% | 2–50% |
| Solvent | 0–90% | 0–40% | 0–10% |

Where the unsaturated precursor of the halo organic compound is employed in the reaction mixture, it is frequently advantageous to employ polymerization inhibitors in order to prevent polymer formation. These inhibitors do not interfere with the coupling reactions and do effectively suppress the formation of polymer. Illustratively, the inhibitors are used in amounts ranging from about 0.01 to 10 percent by weight based on said unsaturated precursor. Specific examples of inhibitors include hydroquinone, methylene blue, p-nitrosodimethyl aniline, methoxyphenol, di-t-butyl paracresol, and the like.

The coupling reaction can be carried out in accordance with continuous or batch procedures. In either case, the reaction mixture contains the coupled product, i.e.,

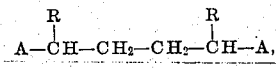

the reacted coupling agent in the form of the halide, e.g., $FeX_2$ or $NiX_2$, $Cu_2X_2$, as well as the promoting salt and may contain solvent, unreacted halo compound and/or coupling agent, the unsaturated halo compound precursor, as well as a small amount of by-product.

Extraction and distillation procedures are also suitable to resolve the reaction mixture. For example, it can be contacted with water and the resulting mixture phase separated into an organic phase containing the bulk of the organic constituents and an aqueous phase containing the reacted coupling agent and promoting salt. The aqueous phase will contain some organics and these can be recovered by stripping and/or extraction with a solvent such as benzene. The salts are recovered by conventional procedures and the reacted coupling agent can be reprocessed. The organics are readily resolved by fractional distillation.

In order to illustrate more fully the instant invention, attention is directed to the following example:

EXAMPLE 110 grams of 3-bromopropionitrile is charged with 12 g iron powder, 24 g ferrous bromide and 6.4 g acrylonitrile (containing 0.2 g methylene blue) into a 500 cc glass autoclave under nitrogen flush. The autoclave is pressurized with 50 psig of nitrogen and heated with agitation for 6 hours at 150°C. After cooling to room temperature 360 cc distilled water is added and the mixture is agitated for 0.5 hours and then separated into aqueous and organic phases. The aqueous phase is extracted three times with 40 cc 3-bromoproprionitrile and the extracts combined with the organic phase.

The organic phase is analyzed by g.l.c. and contains 16 g adiponitrile and 2 g propionitrile. Essentially all the iron salt is in the aqueous phase. The conversion of iron is 100 percent and the adiponitrile yield based on reacted iron is about 70 mole percent.

The organic phase is distilled through a Vigreaux column (½ × 16 in.) at 200 mm Hg and at a reflux ratio of 5/1 to remove propionitrile and acrylonitrile then at 10 mm Hg to recover 3-brompropionitrile (head temperature of 75°C.) and finally at 2 mm Hg to recover adiponitrile (head temperature of 136°–140°C). The in hand yield of adiponitrile is 96 percent of the amount found by analysis in the organic layer.

From carbon analysis of the distillation residue and by-product analysis the 3-bromopropionitrile conversion is calculated to be 52 percent and the selectivity to adiponitrile based on converted 3-bromopropionitrile is 80 mole percent.

The aqueous phase after extraction is charged to an evaporating dish and dried in a vacuum oven at 100°C for 16 hours. From the drying step is recovered 105.4 g ferrous bromide hexahydrate in crystalline form.

The ferrous bromide crystals are charged to a 1 in. diameter glass tube, which is inserted in a tubular electrically heated furnace and dehydrated in a stream of nitrogen for 6 hours at 300°C.

The temperature of the furnace is raised to 650°C and $H_2$ is introduced at a flow rate of 1.5 l/min. The effluent gas is passed through water to dissolve the HBr, which is liberated. Reduction is continued for a period of 2 hours, at the end of which period 0.43 mols HBr have been collected. The partially reduced crystals are cooled and are found by analysis to consist of a mixture of 12 g. of iron and 24 g. ferrous bromide. These solids are then charged to another coupling run. A second run with the recycled material results in essentially the same yield and conversion.

Having thus described the invention, what is claimed and desired to be protected by Letters Patent is:

1. In a process for the production of adiponitrile wherein 3-chloropropionitrile, 3-bromopropionitrile or 3-iodopropionitrile is coupled by reaction in the liquid phase at 50° to 250°C. in the presence of a coupling agent composition consisting essentially of a coupling metal and a halide salt of said metal and wherein said coupling metal is converted to the halide salt during the coupling, the improvement which comprises recovering coupling metal halide salt from the coupling reaction mixture and reducing with hydrogen 50 to 90 percent of said coupling metal halide to form a mixture of coupling metal and coupling metal halide which is recycled as the coupling agent composition to said adiponitrile production.

2. The process of claim 1 wherein said metal has an atomic number from 24 to 30, 47 to 52 or 80 to 83, inclusive.

3. The process of claim 1 wherein metal is nickel, cobalt, chromium or iron.

4. The process of claim 1 wherein the reduction takes place at a temperature from 250° to 1,000°C. and hydrogen is used in amount of from 75 to 0.6 mols of hydrogen for each mol of separated metal salt.

5. The process of claim 1 wherein the coupling metal is iron; the metal salt is a chloride or a bromide of iron; and the partial reduction takes place at a temperature of from 525° to 1000°C. and hydrogen is used in amount of from 50 to 1.2 moles of hydrogen per mole of metal salt; thereby reducing from 50 to 90 mole percent of said metal salt.

6. The process of claim 1 wherein the coupling metal is nickel; the metal salt is a chloride or a bromide of nickel; and the partial reduction takes place at a temperature of from 250° to 700°C. and hydrogen is used in amount of from 50 to 1.2 moles of hydrogen per mole of metal salt; thereby reducing from 50 to 90 mole percent of said metal salt.

7. The process of claim 1 wherein the coupling metal is cobalt; the metal salt is a chloride or a bromide of cobalt; and the partial reduction takes place at a temperature of from 325° to 900°C. and hydrogen is used in amount of from 50 to 1.2 moles of hydrogen per mole of metal salt; thereby reducing from 50 to 90 mole percent of said metal salt.

8. The process of claim 1 wherein the coupling metal is chromium; the metal salt is a chloride or a bromide of chromium; and the partial reduction takes place at a temperature of from 175° to 1,000°C. and hydrogen is used in amount of from 75 to 0.6 moles of hydrogen per mole of metal salt; thereby reducing from 50 to 90 mole percent of said metal salt.

* * * * *